(12) United States Patent
Smith et al.

(10) Patent No.: US 11,994,068 B2
(45) Date of Patent: May 28, 2024

(54) BUFFER HEAT EXCHANGERS FOR HYDROGEN ENGINES

(71) Applicant: Pratt & Whitney Canada Corp., Longueuil (CA)

(72) Inventors: Scott Smith, St. Lambert (CA); Eric Durocher, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 4 days.

(21) Appl. No.: 17/397,889

(22) Filed: Aug. 9, 2021

(65) Prior Publication Data
US 2023/0040971 A1 Feb. 9, 2023

(51) Int. Cl.
| F02C 7/14 | (2006.01) |
| F02C 3/22 | (2006.01) |
| F02C 3/28 | (2006.01) |
| F02C 7/16 | (2006.01) |
| F02C 7/18 | (2006.01) |
| F02C 7/224 | (2006.01) |
| F02C 3/24 | (2006.01) |

(52) U.S. Cl.
CPC .............. *F02C 7/14* (2013.01); *F02C 3/22* (2013.01); *F02C 3/28* (2013.01); *F02C 7/16* (2013.01); *F02C 7/185* (2013.01); *F02C 7/224* (2013.01); *F02C 3/24* (2013.01); *F05D 2220/323* (2013.01); *F05D 2260/213* (2013.01)

(58) Field of Classification Search
CPC ........................................ F02C 7/224
See application file for complete search history.

(56) References Cited

U.S. PATENT DOCUMENTS

| 2014/0140829 A1* | 5/2014 | Blair ........................ F28D 15/00 |
| | | 415/177 |
| 2018/0156120 A1* | 6/2018 | Menheere ............... F28D 15/02 |
| 2020/0369400 A1* | 11/2020 | Razak ...................... F02C 7/224 |
| 2021/0102492 A1* | 4/2021 | Rambo ....................... F02C 3/22 |
| 2023/0243308 A1* | 8/2023 | Jouan ...................... F02C 7/141 |
| | | 60/39.465 |

FOREIGN PATENT DOCUMENTS

| CN | 211291131 U | 8/2020 |
| CN | 113063310 A | 7/2021 |
| DE | 102006027179 A1 | 6/2006 |
| EP | 3158264 A1 | 4/2017 |
| KR | 20080067005 A | 7/2008 |
| WO | WO-2021067365 A1 | 4/2021 |

* cited by examiner

*Primary Examiner* — Katheryn A Malatek
*Assistant Examiner* — Alyson Joan Harrington
(74) *Attorney, Agent, or Firm* — NORTON ROSE FULBRIGHT CANADA LLP

(57) ABSTRACT

In accordance with at least one aspect of this disclosure, there is provided a heat exchange system. The heat exchange system includes a first heat exchanger and a second heat exchanger. The first heat exchanger includes an engine fluid conduit fluidly connecting an engine fluid inlet to an engine fluid outlet. A first internal buffer fluid conduit fluidly connects a first buffer fluid inlet to a first buffer fluid outlet where the engine fluid conduit is in fluid isolation from the first internal buffer fluid conduit but is in thermal communication with the first internal buffer fluid conduit for heat exchange between the engine fluid and the buffer fluid.

5 Claims, 5 Drawing Sheets

BUFFER HEAT EXCHANGERS FOR HYDROGEN ENGINES

TECHNICAL FIELD

The present disclosure relates to heat exchange for combustible fluids.

BACKGROUND

There is always a need in the art for improvements to heat exchangers for converting liquid hydrogen to gas such as in aerospace applications.

SUMMARY

In accordance with at least one aspect of this disclosure, there is provided a heat exchange system. The heat exchange system includes a first heat exchanger and a second heat exchanger. The first heat exchanger includes an engine fluid conduit fluidly connecting an engine fluid inlet to an engine fluid outlet. A first internal buffer fluid conduit fluidly connects a first buffer fluid inlet to a first buffer fluid outlet. The engine fluid conduit is in fluid isolation from the first internal buffer fluid conduit but is in thermal communication with the first internal buffer fluid conduit for heat exchange between the engine fluid conduit and the first internal buffer fluid conduit.

The second heat exchanger includes a hydrogen fluid conduit fluidly connecting a hydrogen fluid inlet to a hydrogen fluid outlet. A second internal buffer fluid conduit fluidly connects a second buffer fluid inlet to a second buffer fluid outlet, where the hydrogen fluid conduit is in fluid isolation from the second internal buffer fluid conduit but is in thermal communication with the second internal buffer fluid conduit for heat exchange between the hydrogen fluid conduit and the second internal buffer fluid conduit.

A first external buffer fluid conduit fluidly connects the first buffer fluid outlet to the second buffer fluid inlet for flow of buffer fluid out of the first heat exchanger into the second heat exchanger. A second external buffer fluid conduit fluidly connects the second buffer fluid outlet to the first buffer fluid inlet for flow of buffer fluid out of the second heat exchanger and into the first heat exchanger.

In certain embodiments, the engine fluid is a first engine fluid, the second heat exchanger is disposed in an external hydrogen fluid conduit, such that the hydrogen fluid conduit is a first internal hydrogen fluid conduit, the hydrogen fluid inlet is a first hydrogen fluid inlet, and the hydrogen fluid outlet is a first hydrogen fluid outlet. In certain such embodiments, the system includes a third heat exchanger.

The third heat exchanger includes a second engine fluid conduit fluidly connecting a second engine fluid inlet to a second engine fluid outlet. A third internal buffer fluid conduit fluidly connects a third buffer fluid inlet to a third buffer fluid outlet. The second engine fluid conduit is in fluid isolation from the third internal buffer fluid conduit, but is in thermal communication with the third internal buffer fluid conduit for heat exchange between the second engine fluid conduit and the third internal buffer fluid conduit.

The system includes a fourth heat exchanger having a second internal hydrogen fluid conduit fluidly connecting a second hydrogen fluid inlet to a second hydrogen fluid outlet. A fourth internal buffer fluid conduit fluidly connecting a fourth buffer fluid inlet with a fourth buffer fluid outlet. The second internal hydrogen fluid conduit is in fluid isolation from the fourth internal buffer fluid conduit, but is in thermal communication with the fourth internal buffer fluid conduit for heat exchange between the second internal hydrogen fluid conduit and the fourth internal buffer fluid conduit.

A third external buffer fluid conduit fluidly connects the third buffer fluid outlet to the fourth buffer fluid inlet for flow of buffer fluid out of the third heat exchanger into the fourth heat exchanger, and a fourth external buffer fluid conduit fluidly connects the fourth buffer fluid outlet to the third buffer fluid inlet for flow of buffer fluid out of the fourth heat exchanger and into the third heat exchanger.

In certain embodiments, the system includes a fifth heat exchanger. The fifth heat exchanger includes a third engine fluid conduit fluidly connecting a third engine fluid inlet to a third engine fluid outlet, and a fifth internal fluid buffer conduit fluidly connecting a fifth buffer fluid inlet to a fifth buffer fluid outlet. The third engine fluid conduit is in fluid isolation from the fifth internal buffer fluid conduit, but is in thermal communication with the fifth internal buffer fluid conduit for heat exchange between the third engine fluid conduit and the fifth internal buffer fluid conduit.

A sixth heat exchanger includes a third internal hydrogen fluid conduit fluidly connecting a third hydrogen fluid inlet to a third hydrogen fluid outlet, and a sixth internal buffer fluid conduit fluidly connecting a sixth buffer fluid inlet to a sixth buffer fluid outlet. The third internal hydrogen fluid conduit is in fluid isolation from the sixth internal buffer fluid conduit, but is in thermal communication with the sixth internal buffer fluid conduit for heat exchange between the third internal hydrogen fluid conduit and the sixth internal buffer fluid conduit.

A fifth external buffer fluid conduit fluidly connects the fifth buffer fluid outlet to the sixth buffer fluid inlet for flow of buffer fluid out of the fifth heat exchanger into the sixth heat exchanger, and a sixth external buffer fluid conduit fluidly connects the sixth buffer fluid outlet to the fifth buffer fluid inlet for flow of buffer fluid out of the sixth heat exchanger and into the fifth heat exchanger.

In certain embodiments, the second buffer fluid conduit is a through channel. In certain such embodiments, the first heat exchanger further includes, a second engine fluid conduit fluidly connecting a second engine fluid inlet to a second engine fluid outlet. The second engine fluid conduit is in fluid isolation from the first internal buffer fluid conduit and the first engine fluid conduit, but is in thermal communication with the first internal buffer fluid conduit and the first engine fluid conduit for heat exchange between the second engine fluid conduit, the first engine fluid conduit, and the first internal buffer fluid conduit.

A third heat exchanger is included, having a third engine fluid conduit fluidly connecting a third engine fluid inlet to a third engine fluid outlet. A third internal fluid buffer conduit fluidly connecting a third buffer fluid inlet to a third buffer fluid outlet. The third engine fluid conduit is in fluid isolation from the third internal buffer fluid conduit, but is in thermal communication with the third internal buffer fluid conduit for heat exchange between the third engine fluid conduit and the third internal buffer fluid conduit.

The first external buffer fluid conduit fluidly connects the first buffer fluid outlet to the third buffer fluid inlet through the second buffer fluid conduit for flow of buffer fluid out of the first heat exchanger, through the second heat exchanger, and into the third heat exchanger, and the second external buffer fluid conduit fluidly connects the third buffer fluid outlet to the first buffer fluid inlet for flow of buffer fluid out of the third heat exchanger, through the second heat exchanger, and into the first heat exchanger.

In certain embodiments, the second fluid conduit is not a through channel. In certain such embodiments, the engine fluid is a first engine fluid, and the first heat exchanger further includes a second engine fluid conduit fluidly connecting a second engine fluid inlet to a second engine fluid outlet. The second engine fluid conduit is in fluid isolation from the first internal buffer fluid conduit and the first engine fluid conduit, but is in thermal communication with the first internal buffer fluid conduit and the first engine fluid conduit for heat exchange between the second engine fluid conduit, the first engine fluid conduit, and the first internal buffer fluid conduit.

The second heat exchanger includes a third internal buffer fluid conduit fluidly connecting a third buffer fluid inlet to a third buffer fluid outlet. The hydrogen fluid conduit is in fluid isolation from the third internal buffer fluid conduit, but is in thermal communication with the third internal buffer fluid conduit for heat exchange between the hydrogen fluid conduit and the buffer fluid conduit.

The system includes a third heat exchanger having a third engine fluid conduit fluidly connecting a third engine fluid inlet to a third engine fluid outlet, and a fourth internal buffer fluid conduit fluidly connecting a fourth buffer fluid inlet to a fourth buffer fluid outlet. The third engine fluid conduit is in fluid isolation from the fourth internal buffer fluid conduit, but is in thermal communication with the fourth internal buffer fluid conduit for heat exchange between the second engine fluid conduit and the fourth internal buffer fluid conduit.

A third external buffer fluid conduit fluidly connects the third buffer fluid outlet to the fourth buffer fluid inlet for flow of buffer fluid out of the second heat exchanger into the third heat exchanger, and a fourth external buffer fluid fluidly conduit connects the fourth buffer fluid outlet to the third buffer fluid inlet for flow of buffer fluid out of the third heat exchanger and into the second heat exchanger.

In embodiments, the second heat exchanger is disposed in a main external hydrogen fluid conduit, and the hydrogen fluid conduit is a first internal hydrogen fluid conduit, the hydrogen fluid inlet is a first hydrogen fluid inlet, and the hydrogen fluid outlet is a first hydrogen fluid outlet. The system includes a fourth heat exchanger having a third engine fluid conduit fluidly connecting a third engine fluid inlet to a third engine fluid outlet, and a fifth internal buffer fluid conduit fluidly connecting a fifth buffer fluid inlet to a fifth buffer fluid outlet. The third engine fluid conduit is in fluid isolation from the fifth internal buffer fluid conduit, but is in thermal communication with the fifth internal buffer fluid conduit for heat exchange between the third engine fluid conduit and the fifth internal buffer fluid conduit.

A fifth heat exchanger is disposed in the main external hydrogen fluid conduit. The fifth heat exchanger includes a second internal hydrogen fluid conduit fluidly connecting a second hydrogen fluid outlet to a second hydrogen fluid outlet, such that the main external hydrogen fluid conduit connects the first hydrogen inlet to the second hydrogen inlet through first internal hydrogen conduit of the second heat exchanger and the second hydrogen outlet of the fifth heat exchanger.

A sixth internal buffer fluid conduit fluidly connects a sixth buffer fluid inlet to a sixth buffer fluid outlet, where the second internal hydrogen fluid conduit is in fluid isolation from the sixth internal buffer fluid conduit, but is in thermal communication with the sixth internal buffer fluid conduit for heat exchange between the second internal hydrogen fluid conduit and the sixth internal buffer fluid conduit.

A fifth external buffer fluid conduit fluidly connects the fifth buffer fluid outlet to the sixth buffer fluid inlet for flow of buffer fluid out of the fifth heat exchanger into the sixth heat exchanger, and a sixth external buffer fluid conduit fluidly connects the sixth buffer fluid outlet to the fifth buffer fluid inlet for flow of buffer fluid out of the sixth heat exchanger and into the fifth heat exchanger.

In embodiments, a fourth heat exchanger includes a third engine fluid conduit fluidly connecting a third engine fluid inlet to a third engine fluid outlet. A fifth internal buffer fluid conduit fluidly connects a fifth buffer fluid inlet to a fifth buffer fluid outlet. The third engine fluid conduit is in fluid isolation from the fifth internal buffer fluid conduit, but is in thermal communication with the fifth internal buffer fluid conduit for heat exchange between the third engine fluid conduit and the fifth internal buffer fluid conduit.

In certain such embodiments, the second heat exchanger includes a sixth internal buffer fluid conduit fluidly connecting a sixth buffer fluid inlet to a sixth buffer fluid outlet such that the hydrogen fluid conduit is in fluid isolation from the sixth internal buffer fluid conduit, but is in thermal communication with the sixth buffer fluid conduit for heat exchange between hydrogen fluid conduit and the sixth internal buffer fluid conduit.

A fifth external buffer fluid conduit fluidly connects the fifth buffer fluid outlet to the sixth buffer fluid inlet for flow of buffer fluid out of the fifth heat exchanger into the second heat exchanger, and a sixth external buffer fluid conduit fluidly connects the sixth buffer fluid outlet to the fifth buffer fluid inlet for flow of buffer fluid out of the second heat exchanger and into the fifth heat exchanger.

In accordance with another aspect of this disclosure, there is provided an aircraft. The aircraft includes a gas turbine engine having at least an engine oil system, a combustor, and a compressor. The aircraft also includes any of the heat exchange systems as described above, or any suitable combination of embodiments provided therein.

In certain embodiments, the first heat exchanger is fluidly connected to the engine oil system, the third heat exchanger is fluidly connected to the compressor, the fifth heat exchanger is fluidly connected to the turbine section, and each of the first, third, and fifth heat exchangers are fluidly connected to at least one additional engine component for flow from the first, third, and fifth heat exchangers to a respective engine component.

In certain embodiments, the first engine fluid is engine oil, the second engine fluid is engine compressor bleed air, and the third engine fluid is engine turbine exhaust. In certain embodiments, the hydrogen fluid is liquid hydrogen, where a liquid hydrogen source is fluidly connected to a combustor via each of the first, second, and third hydrogen fluid conduits. In certain embodiments, the buffer fluid is a non-flammable fluid. In certain embodiments, the buffer fluid has zero water content.

In accordance with yet another aspect of this disclosure, there is provided a method for exchanging heat between hydrogen and an engine fluid. In embodiments, the method includes flowing an engine fluid through an engine fluid conduit of a first heat exchanger, flowing hydrogen through a hydrogen conduit of a second heat exchanger, and flowing a buffer fluid through a first buffer fluid conduit of the first heat exchanger and a second buffer fluid conduit of the second heat exchanger.

The engine fluid conduit and the first buffer fluid conduit are fluidly isolated, and the hydrogen conduit and the second buffer fluid conduit are fluidly isolated, The method includes exchanging heat between the first engine fluid conduit and the first buffer fluid conduit and exchanging heat between the second buffer fluid conduit and the hydrogen conduit.

In certain embodiments, the method includes flowing a second engine fluid through a second engine fluid conduit of a third heat exchanger, flowing the buffer fluid through a third buffer fluid conduit in the third heat exchanger and the second buffer fluid conduit of the second heat exchanger, exchanging heat between the second engine fluid and the third buffer fluid conduit.

In certain embodiments, the method includes flowing a second engine fluid through a second engine conduit of the first heat exchanger. In certain such embodiments, the second engine fluid conduit, the first engine fluid conduit, and the first buffer fluid conduit are fluidly isolated, and the method includes exchanging heat between the second engine fluid conduit and the first buffer fluid conduit.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
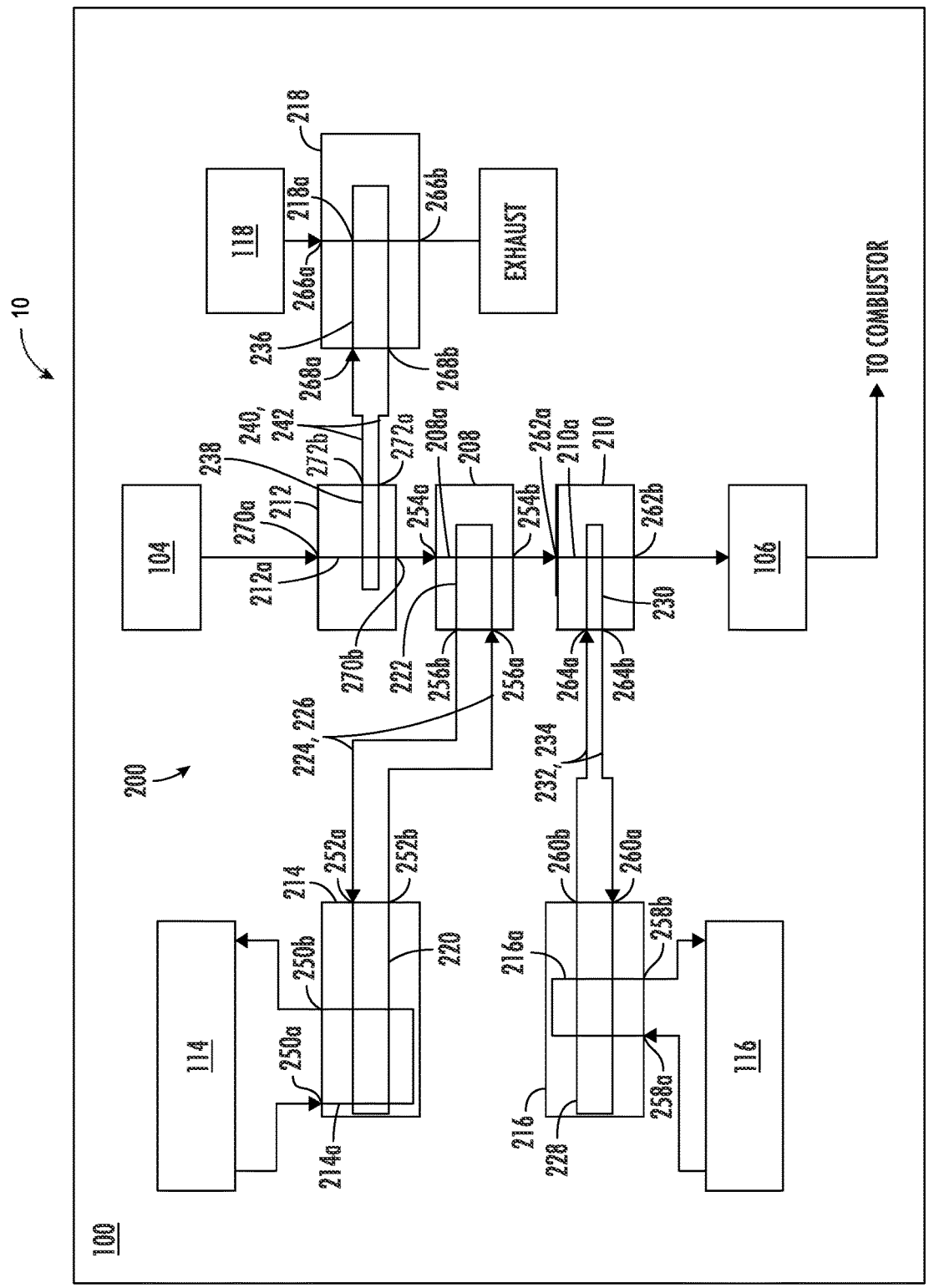
FIG. 1. is a schematic view of a heat exchange system in accordance with the present disclosure, showing a plurality of engine fluids exchanging heat with hydrogen fluid through a buffer fluid.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-5.

The present disclosure relates generally to heat exchange, and more particularly to heat exchangers in hydrogen powered engines such as for use in aerospace applications, for example, engine 100 of aircraft 1 as shown. In certain embodiments, the aircraft 1 can include an engine 100, where the engine 100 can be a propulsive energy engine (e.g. creating thrust for the aircraft 1), or a non-propulsive energy engine, and a fuel system. As described herein, the engine 100 is a turbofan engine, although the present disclosure may likewise be used with other engine types.

In aerospace applications, hydrogen is often considered as a fuel whenever low carbon emissions are desired. Hydrogen is often stored cryogenically in order to maximize its energy density per unit volume, but needs to be converted in gaseous state in order to burn it into combustor chamber of a thermo-cycle engine to generate power for aircraft propulsion. There are several engine heat sources, e.g., oil system, compressor air bleed system and turbine stage exhaust, which can be used to convert liquid hydrogen to gaseous state using heat exchanger.

Turning now to FIG. 1, in accordance with at least one aspect of this disclosure, a heat exchange system 200 includes a first heat exchanger 214 and a second heat exchanger 208. The first heat exchanger 214 includes a first engine fluid conduit 214a conveying a first engine fluid therethrough and fluidly connecting a first engine fluid inlet 250a to a first engine fluid outlet 250b. A first internal buffer fluid conduit 220 conveying buffer fluid therethrough fluidly connects a first buffer fluid inlet 252a to a first buffer fluid outlet 252b where the first engine fluid conduit 214a is in fluid isolation from the first internal buffer fluid conduit 220 but is in thermal communication with the first internal buffer fluid conduit 220 for heat exchange between the first engine fluid conduit 214a and the first internal buffer fluid conduit 220.

The second heat exchanger 208 includes a hydrogen fluid conduit 208a conveying hydrogen fluid therethrough and fluidly connecting a hydrogen fluid inlet 254a to a hydrogen fluid outlet 254b. A second internal buffer fluid conduit 222 conveying buffer fluid therethrough fluidly connects a second buffer fluid inlet 256a to a second buffer fluid outlet 256b, where the hydrogen fluid conduit 208a is in fluid isolation from the second internal buffer fluid conduit 222 but is in thermal communication with the second internal buffer fluid conduit 222 for heat exchange between the hydrogen fluid conduit 208a and the second internal buffer fluid conduit 222.

A first external buffer fluid conduit 224 fluidly connects the first buffer fluid outlet 252b to the second buffer fluid inlet 256a for flow of buffer fluid out of the first heat exchanger 214a into the second heat exchanger 208, and a second external buffer fluid conduit 226 fluidly connects the second buffer fluid outlet 256b to the first buffer fluid inlet 256a for flow of buffer fluid out of the second heat exchanger 208 and into the first heat exchanger 214a.

A third heat exchanger 216 includes a second engine fluid conduit 216a fluidly connecting a second engine fluid inlet 258a to a second engine fluid outlet 258a. A third internal buffer fluid conduit 228 fluidly connects a third buffer fluid inlet 260a to a third buffer fluid outlet 260b. The second engine fluid conduit 216a is in fluid isolation from the third internal buffer fluid conduit 228, but is in thermal communication with the third internal buffer fluid conduit 228 for heat exchange between the second engine fluid conduit 216a and the third internal buffer fluid conduit 228.

A fourth heat exchanger 218 having a second internal hydrogen fluid conduit 210a fluidly connects a second hydrogen fluid inlet 262a to a second hydrogen fluid outlet 262b. A fourth internal buffer fluid conduit 230 fluidly connects a fourth buffer fluid inlet 264a to a fourth buffer fluid outlet 264b. The second internal hydrogen fluid conduit 210a is in fluid isolation from the fourth internal buffer fluid conduit 230, but is in thermal communication with the fourth internal buffer fluid conduit 230 for heat exchange between the second internal hydrogen fluid conduit 210a and the fourth internal buffer fluid conduit 230.

A third external buffer fluid conduit 232 fluidly connects the third buffer fluid outlet 260b to the fourth buffer fluid inlet 264a for flow of buffer fluid out of the third heat exchanger 216 into the fourth heat exchanger 210, and a fourth external buffer fluid conduit 234 fluidly connects the fourth buffer fluid outlet 264b to the third buffer fluid inlet 260a for flow of buffer fluid out of the fourth heat exchanger 210 and into the third heat exchanger 216.

A fifth heat exchanger 218 includes a third engine fluid conduit 218a fluidly connecting a third engine fluid inlet 266a to a third engine fluid outlet 266b, and a fifth internal fluid buffer conduit 236 fluidly connecting a fifth buffer fluid inlet 268a to a fifth buffer fluid outlet 268b. The third engine fluid conduit 218a is in fluid isolation from the fifth internal buffer fluid conduit 236, but is in thermal communication with the fifth internal buffer fluid conduit 236 for heat exchange between the third engine fluid conduit 218a and the fifth internal buffer fluid conduit 236.

A sixth heat exchanger 212 includes a third internal hydrogen fluid conduit 212a fluidly connecting a third hydrogen fluid inlet 270a to a third hydrogen fluid outlet 270b, and a sixth internal buffer fluid conduit 238 fluidly connecting a sixth buffer fluid inlet 272a to a sixth buffer fluid outlet 272b. The third internal hydrogen fluid conduit 212a is in fluid isolation from the sixth internal buffer fluid conduit 238, but is in thermal communication with the sixth internal buffer fluid conduit 238 for heat exchange between the third internal hydrogen fluid conduit 212a and the sixth internal buffer fluid conduit 238.

A fifth external buffer fluid conduit 240 fluidly connects the fifth buffer fluid outlet 268b to the sixth buffer fluid inlet 272a for flow of buffer fluid out of the fifth heat exchanger 218 into the sixth heat exchanger 212, and a sixth external buffer fluid conduit 242 fluidly connects the sixth buffer fluid outlet 272b to the fifth buffer fluid inlet 268a for flow of buffer fluid out of the sixth heat exchanger 212 and into the fifth heat exchanger 218.

With continued reference to FIG. 1, the system 200 (or any system described herein) can be included in the aircraft 1, for example an aircraft having a gas turbine engine 100. The gas turbine engine 100 includes, among other things, at least an engine oil system 114, a compressor 116, and a turbine section 118 (e.g. configured to extract work from combustion products of a combustor to drive the compressor 116). In embodiments, the first heat exchanger 214 is fluidly connected to the engine oil system 114, the third heat exchanger 216 is fluidly connected to the compressor 116, the fifth heat exchanger 218 is fluidly connected to the combustor via the turbine section 118, and each of the first, third, and fifth heat exchangers 214, 216, 218 are fluidly connected to at least one additional respective engine component for flow from the first, third, and fifth heat exchangers 214, 216, 218 to the respective engine component.

The first engine fluid can be engine oil, the second engine fluid can be engine compressor bleed air, and the third engine fluid can be engine turbine exhaust, however any suitable engine fluid can be used, or more or less engine fluids may be included. In certain embodiments, the hydrogen fluid is liquid hydrogen, where a liquid hydrogen source 104 is fluidly connected to the third hydrogen fluid outlet 262b, issuing to fuel manifold 106, via each of the first, second, and third hydrogen fluid conduits 212a, 208a, 210a. The buffer fluid should be any suitable non-flammable fluid, for example any fluid having zero water content and a low freezing point.

The temperature of the hydrogen increases as it passes through the series of heat exchangers 212, 208, 210. The system 200 as described above with reference to FIG. 1 contains six heat exchangers, three being engine fluid heat exchangers 214, 216, 218 and three being hydrogen fluid heat exchangers 208, 210, 212, corresponding in a one-to-one ratio. However, the system 200 can operate with any number (e.g. more or less than three) of engine fluid heat exchangers and hydrogen fluid heat exchangers in a similar configuration, e.g. one-to-one, where each heat exchanger is fluidly connected to its respective counterpart by separate external buffer fluid conduits, for a given engine or application. As described below however, in certain embodiments, different ratios of engine fluid heat exchangers to hydrogen fluid heat exchangers and in different configurations are contemplated herein (e.g. not one-to-one).

Figure 2:
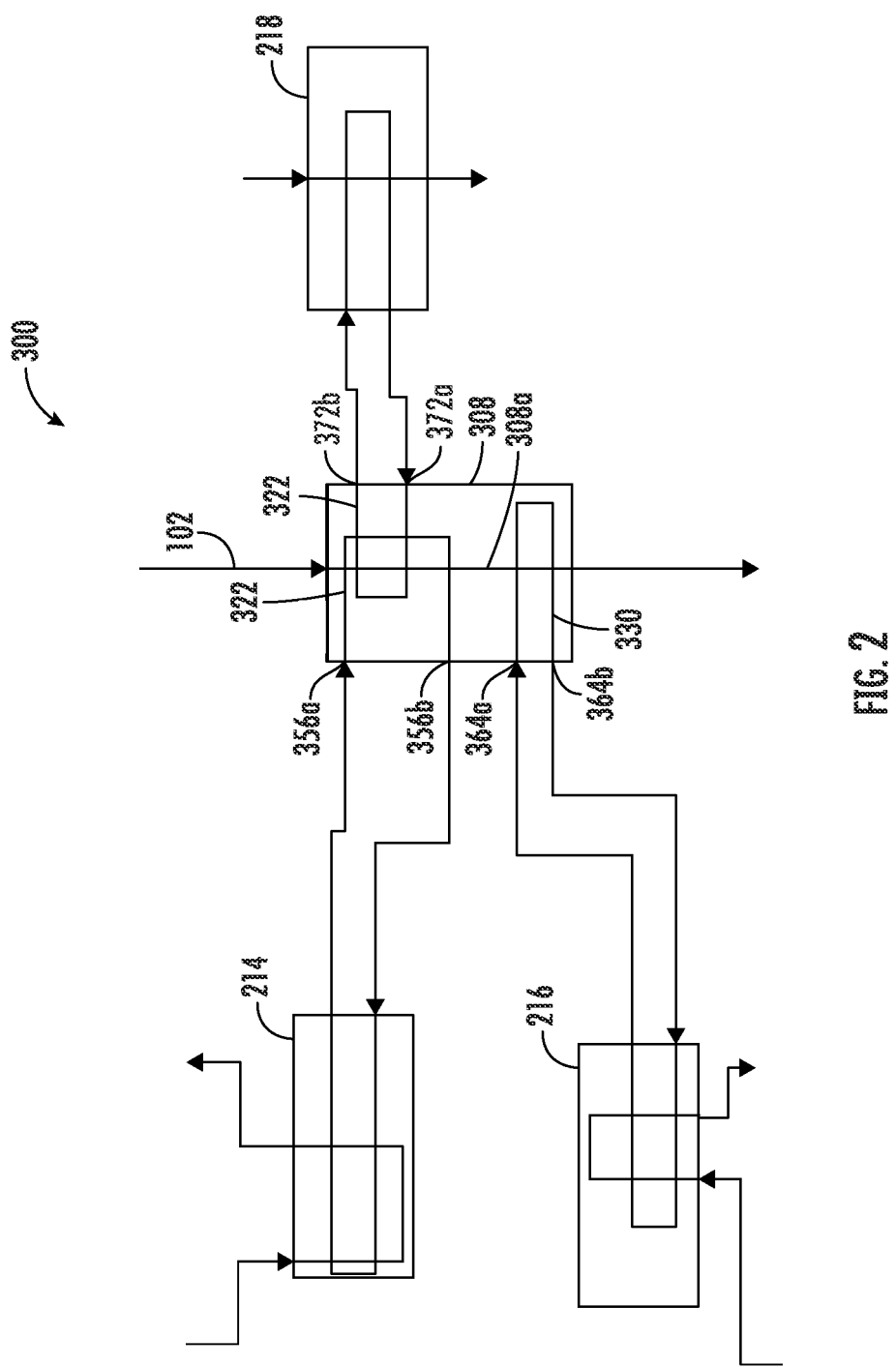
FIG. 2 is a schematic view of another configuration of the heat exchange system of FIG. 2.

For example, as shown in FIG. 2, in embodiments, a heat exchange system 300 can have similar components as in heat exchange system 200. For brevity, the description of common elements that have been described above are not repeated. In system 300, three engine fluid heat exchangers 214, 216, 218 are provided as described above. However, rather than three individual hydrogen fluid heat exchangers (e.g. 208, 210, 212) provided in the main external hydrogen fluid conduit 102, a single, fourth heat exchanger 308 is provided in the main external hydrogen fluid conduit 102 having an internal hydrogen conduit 308a. The fourth heat exchanger 308 includes a respective engine fluid conduit 322, 330, 338, having a respective inlet and outlet, for flow of buffer fluid from each engine fluid heat exchanger 214, 216, 218.

Figure 3:
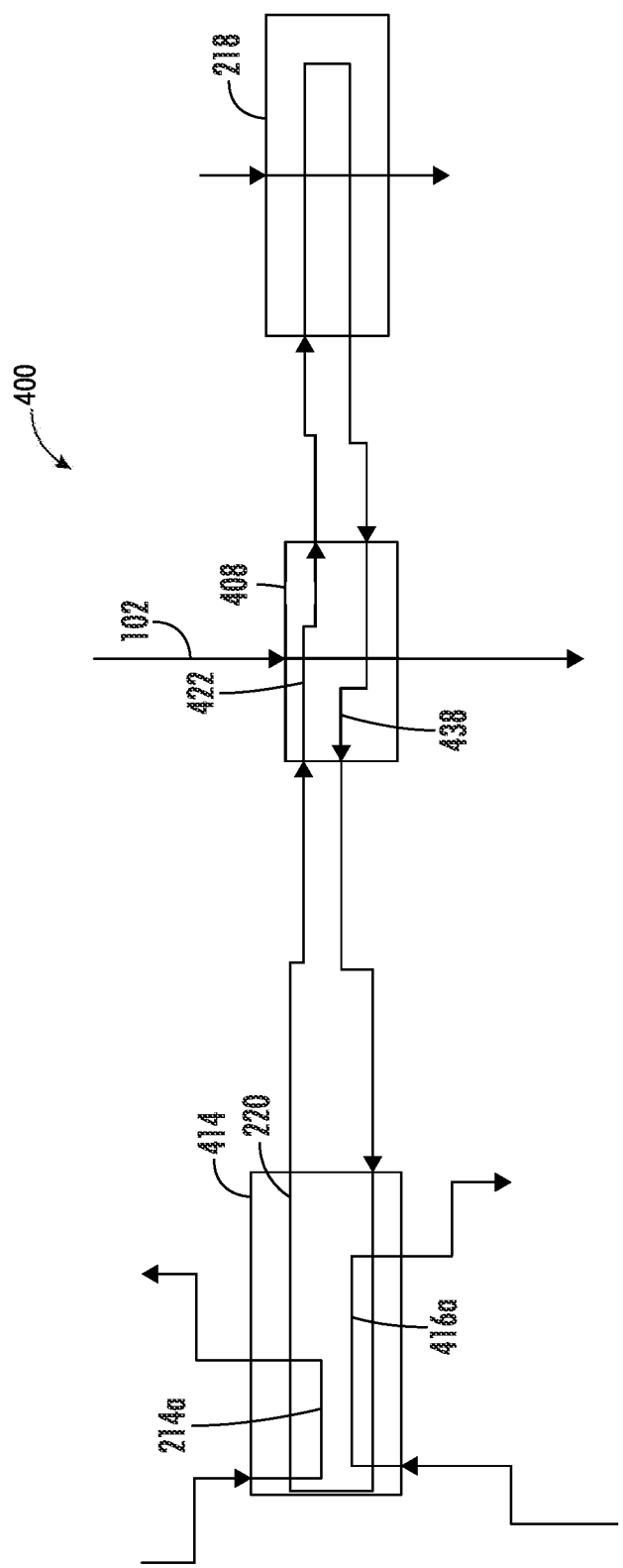
FIG. 3 is a schematic view of another configuration of the heat exchange system of FIG. 2.

In certain embodiments, as shown in FIG. 3, a heat exchange system 400 can have similar components as in heat exchange systems 200, 300. For brevity, the description of common elements that have been described above are not repeated. In system 400, a single hydrogen fluid heat exchanger 408 can be included in the main external hydrogen fluid conduit 102, while two engine fluid heat exchangers 414, 218 share the single hydrogen fluid heat exchanger 408. In some embodiments, but not all embodiments, the second buffer fluid conduit 422 and fourth buffer fluid conduit 438 are through channels, whereby the buffer fluid passes straight through the hydrogen fluid heat exchanger 408, between the first and second engine fluid heat exchangers 414, 218.

Moreover, in this embodiment, and in other embodiments, the first engine fluid heat exchanger 414 may also be shared amongst multiple engine fluids (e.g. two as shown). In this case a second engine fluid conduit 416a is in fluid isolation from the first internal buffer fluid conduit 220 and the first engine fluid conduit 214a. But both fluid conduits 416a and 214a are in thermal communication with the first internal buffer fluid conduit 220 and the first engine fluid conduit 214a for heat exchange between the first buffer fluid and both of the first and second engine fluids in a single heat exchanger 414. The third heat exchanger 218 may or may not be shared amongst multiple engine fluids.

Figure 4:
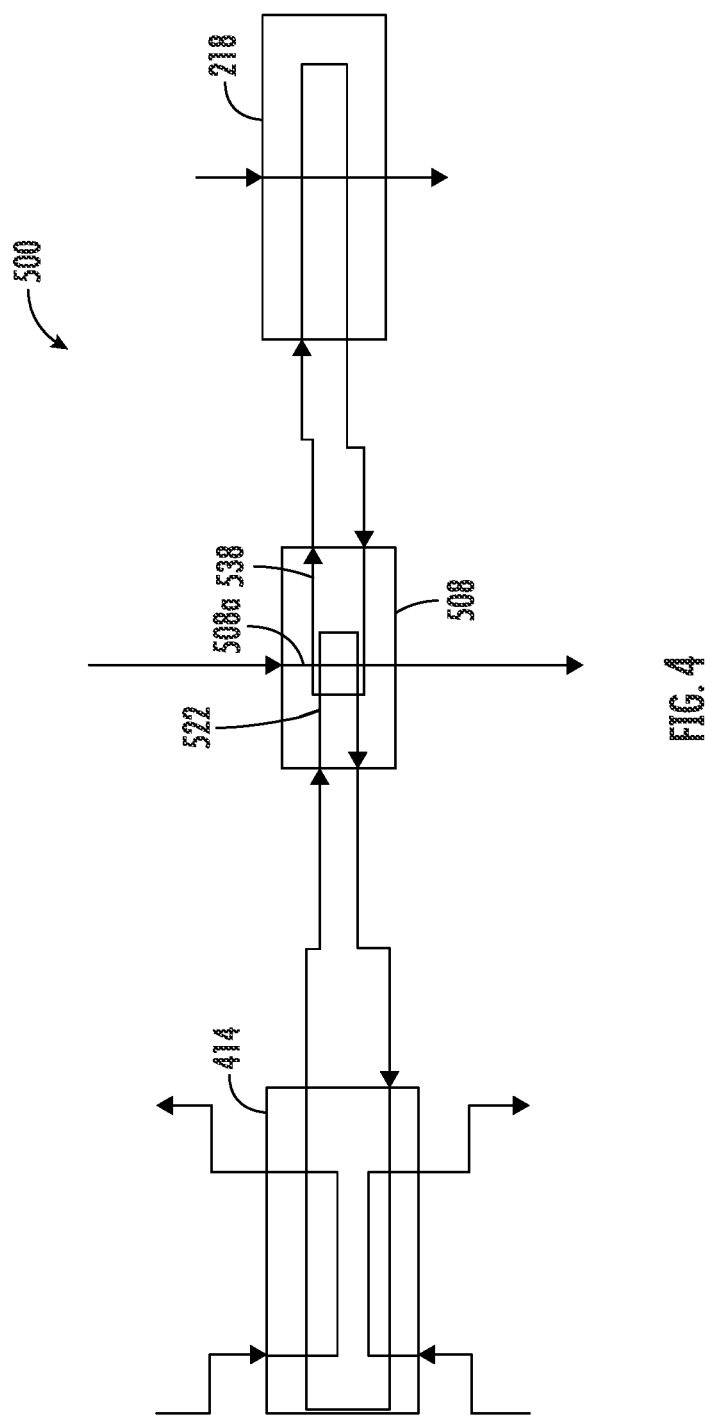
FIG. 4 is a schematic view of another configuration of the heat exchange system of FIG. 2.

In some embodiments, as shown in FIG. 4, a heat exchange system 500 can have similar components as in heat exchange system 400. For brevity, the description of common elements that have been described above are not repeated. In system 500, the configuration is largely the same with the exception that the buffer fluid conduits 422, 438 are not through channels. Instead, the second heat exchanger includes 508 a respective internal buffer fluid conduit 522, 538 for each respective engine fluid heat exchanger 414, 218, so two buffer fluid conduits 522, 538 can exchange heat with a single hydrogen conduit 508a in a single heat exchanger 508.

Figure 5:
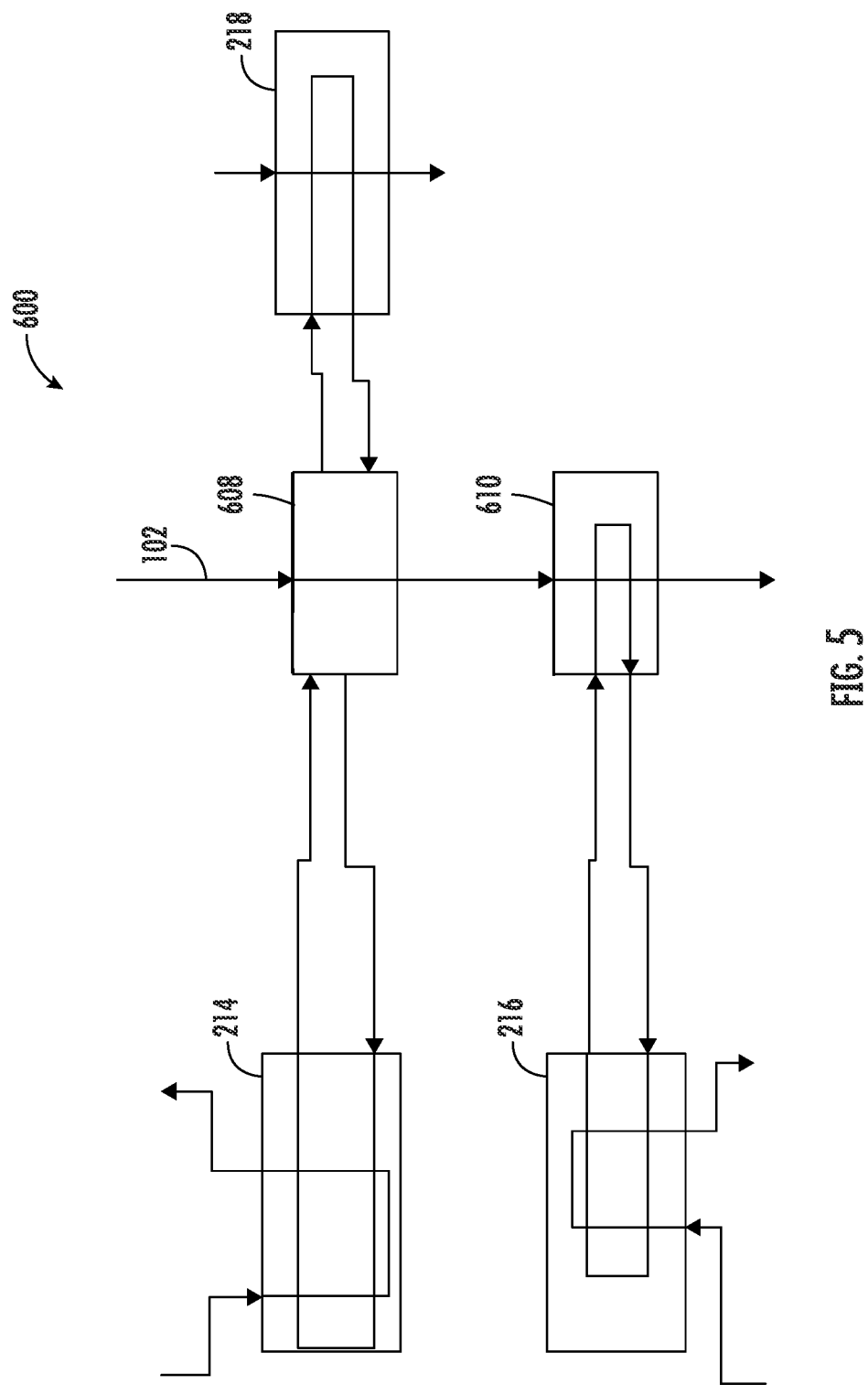
FIG. 5 is a schematic view of another configuration of the heat exchange system of FIG. 2.

In certain embodiments, as shown in FIG. 5, a heat exchange system 600 can have similar components as in heat exchange system 400 and 500. For brevity, the description of common elements that have been described above are not repeated. In system 600, the configuration is largely the same with the exception that no engine fluid heat exchangers

214, 216, 218 are shared amongst multiple engine fluids. Thus, a total of two hydrogen fluid heat exchangers 608, 610 are included in the main external hydrogen fluid conduit 102. However, as shown, it is still possible that one of the hydrogen fluid heat exchangers (e.g. 608 as shown) is shared between multiple engine fluid heat exchangers 214, 218, much as described above with reference to FIGS. 3 and 4. Therefore, in this embodiment, it is possible that the shared hydrogen fluid heat exchanger 608 may have buffer fluid conduits similar to that in system 400 (e.g. through channel buffer fluid conduits 422, 438) or similar to that in 500 (e.g. individual buffer fluid conduits 522, 538).

In accordance with yet another aspect of this disclosure, there is provided a method for exchanging heat between hydrogen and an engine fluid (e.g. using any of systems 200-600 as provided herein). In embodiments, the method includes flowing an engine fluid (e.g. engine oil, compressor bleed air, or turbine exhaust) through an engine fluid conduit (e.g. engine fluid conduit 214a) of a first heat exchanger (e.g. heat exchanger 214), flowing hydrogen through a hydrogen conduit (e.g. conduit 208a) of a second heat exchanger (e.g. heat exchanger 208), and flowing a buffer fluid through a first buffer fluid conduit (e.g. conduit 220) of the first heat exchanger and a second buffer fluid conduit (e.g. conduit 222) of the second heat exchanger. The engine fluid conduit and the first buffer fluid conduit are fluidly isolated, and the hydrogen conduit and the second buffer fluid conduit are fluidly isolated. The method also includes exchanging heat between the engine fluid and the buffer fluid and exchanging heat between the buffer fluid and the hydrogen.

The method can include exchanging heat between any number of engine fluids and hydrogen, by flowing the respective engine fluid(s) through any number of individual or shared heat exchangers, and exchanging heat between the respective engine fluid and the buffer fluid. The heat from the engine fluid can then be transferred through the buffer fluid to the hydrogen via any number of hydrogen fluid heat exchangers, whether individual or shared.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure. For example, the following particular embodiments of the present technology are likewise contemplated, as described herein next by clauses.

Clause 1. A heat exchange system (200) for an aircraft engine (100) comprising:
    a first heat exchanger (214) comprising:
        an engine fluid conduit (214a) fluidly connecting an engine fluid inlet (250a) to an engine fluid outlet (250b); and
        a first internal buffer fluid conduit (220) fluidly connecting a first buffer fluid inlet (252a) to a first buffer fluid outlet (252b),
        wherein the engine fluid conduit is in fluid isolation from the first internal buffer fluid conduit, and wherein the engine fluid conduit is in thermal communication with the first internal buffer fluid conduit for heat exchange between the engine fluid conduit and the first internal buffer fluid conduit;
    a second heat exchanger (208) comprising:
        a hydrogen fluid conduit (208a) fluidly connecting a hydrogen fluid inlet (254a) to a hydrogen fluid outlet (254b); and
        a second internal buffer fluid conduit (222) fluidly connecting a second buffer fluid inlet (256a) to a second buffer fluid outlet (256b),
        wherein the hydrogen fluid conduit is in fluid isolation from the second internal buffer fluid conduit, and wherein the hydrogen fluid conduit is in thermal communication with the second internal buffer fluid conduit for heat exchange between the hydrogen fluid conduit and the second internal buffer fluid conduit;
    a first external buffer fluid conduit (224) fluidly connecting the first buffer fluid outlet to the second buffer fluid inlet for flow of buffer fluid out of the first heat exchanger into the second heat exchanger; and
    a second external buffer fluid conduit (226) fluidly connecting the second buffer fluid outlet to the first buffer fluid inlet for flow of buffer fluid out of the second heat exchanger and into the first heat exchanger.

Clause 2. The system as recited in clause 1, wherein the engine fluid is a first engine fluid, wherein the second heat exchanger is disposed in a main external hydrogen fluid conduit (102), wherein the hydrogen fluid conduit is a first internal hydrogen fluid conduit, the hydrogen fluid inlet is a first hydrogen fluid inlet, and the hydrogen fluid outlet is a first hydrogen fluid outlet, further comprising:
- a third heat exchanger (216) comprising:
  - a second engine fluid conduit (216a) fluidly connecting a second engine fluid inlet (258a) to a second engine fluid outlet (258b); and
  - a third internal buffer fluid conduit (228) fluidly connecting a third buffer fluid inlet (260a) to a third buffer fluid outlet (260b),
  - wherein the second engine fluid conduit is in fluid isolation from the third internal buffer fluid conduit, and wherein the second engine fluid conduit is in thermal communication with the third internal buffer fluid conduit for heat exchange between the second engine fluid conduit and the third internal buffer fluid conduit;
- a fourth heat exchanger (218) comprising:
  - a second internal hydrogen fluid conduit (210a) fluidly connecting a second hydrogen fluid inlet (262a) to a second hydrogen fluid outlet (262b); and
  - a fourth internal buffer fluid conduit (230) fluidly connecting a fourth buffer fluid inlet (264a) to a fourth buffer fluid outlet (264b),
  - wherein the second internal hydrogen fluid conduit is in fluid isolation from the fourth internal buffer fluid conduit, and wherein the second internal hydrogen fluid conduit is in thermal communication with the fourth internal buffer fluid conduit for heat exchange between the second internal hydrogen fluid conduit and the fourth internal buffer fluid conduit;
- a third external buffer fluid conduit (232) fluidly connecting the third buffer fluid outlet to the fourth buffer fluid inlet for flow of buffer fluid out of the third heat exchanger into the fourth heat exchanger; and
- a fourth external buffer fluid conduit (234) fluidly connecting the fourth buffer fluid outlet to the third buffer fluid inlet for flow of buffer fluid out of the fourth heat exchanger and into the third heat exchanger.

Clause 3. The system as recited in clause 2, further comprising:
- a fifth heat exchanger (218) comprising:
  - a third engine fluid conduit (218a) fluidly connecting a third engine fluid inlet (266a) to a third engine fluid outlet (266b); and
  - a fifth internal fluid buffer conduit (236) fluidly connecting a fifth buffer fluid inlet (268a) to a fifth buffer fluid outlet (268b),
  - wherein the third engine fluid conduit is in fluid isolation from the fifth internal buffer fluid conduit, and wherein the third engine fluid conduit is in thermal communication with the fifth internal buffer fluid conduit for heat exchange between the third engine fluid conduit and the fifth internal buffer fluid conduit;
- a sixth heat exchanger (212) comprising:
  - a third internal hydrogen fluid conduit (212a) fluidly connecting a third hydrogen fluid inlet (270a) to a third hydrogen fluid outlet (270b); and
  - a sixth internal buffer fluid conduit (238) fluidly connecting a sixth buffer fluid inlet (272a) to a sixth buffer fluid outlet (272b),
  - wherein the third internal hydrogen fluid conduit is in fluid isolation from the sixth internal buffer fluid conduit, and wherein the third internal hydrogen fluid conduit is in thermal communication with the sixth internal buffer fluid conduit for heat exchange between the third internal hydrogen fluid conduit and the sixth internal buffer fluid conduit;
- a fifth external buffer fluid conduit (240) fluidly connecting the fifth buffer fluid outlet to the sixth buffer fluid inlet for flow of buffer fluid out of the fifth heat exchanger into the sixth heat exchanger; and
- a sixth external buffer fluid conduit fluidly connecting the sixth buffer fluid outlet to the fifth buffer fluid inlet for flow of buffer fluid out of the sixth heat exchanger and into the fifth heat exchanger.

Clause 4. The system as recited in clause 4, wherein the first engine fluid is engine oil, the second engine fluid is engine compressor bleed air, and the third engine fluid is engine turbine exhaust.

Clause 5. The system as recited in clause 4, wherein the hydrogen fluid is liquid hydrogen, and further comprising a liquid hydrogen source (104), wherein the liquid hydrogen source is fluidly connected to a combustor via each of the first, second, and third hydrogen fluid conduits.

Clause 6. The system as recited in clause 1, wherein the engine fluid is a first engine fluid, wherein the second buffer fluid conduit is a through channel;
- wherein the first heat exchanger (414) further includes:
  - a second engine fluid conduit (416a) fluidly connecting a second engine fluid inlet (258a) to a second engine fluid outlet (258b); and
  - wherein the second engine fluid conduit is in fluid isolation from the first internal buffer fluid conduit and the first engine fluid conduit, and wherein the second engine fluid conduit is in thermal communication with the first internal buffer fluid conduit and the first engine fluid conduit for heat exchange between the second engine fluid conduit, the first engine fluid conduit, and the first internal buffer fluid conduit, and further comprising:
- a third heat exchanger (218) comprising:
  - a third engine fluid conduit (218a) fluidly connecting a third engine fluid inlet (266a) to a third engine fluid outlet (266b); and
  - a third internal fluid buffer conduit (228) fluidly connecting a third buffer fluid inlet (260a) to a third buffer fluid outlet (260b),
  - wherein the third engine fluid conduit is in fluid isolation from the third internal buffer fluid conduit, and wherein the third engine fluid conduit is in thermal communication with the third internal buffer fluid conduit for heat exchange between the third engine fluid conduit and the third internal buffer fluid conduit,
  - wherein the first external buffer fluid conduit fluidly connects the first buffer fluid outlet to the third buffer fluid inlet through the second buffer fluid conduit for flow of buffer fluid out of the first heat exchanger, through the second heat exchanger, and into the third heat exchanger;
  - wherein the second external buffer fluid conduit fluidly connects the third buffer fluid outlet to the first buffer fluid inlet for flow of buffer fluid out of the third heat exchanger, through the second heat exchanger, and into the first heat exchanger.

Clause 7. The system as recited in clause 1, wherein the engine fluid is a first engine fluid,
wherein the first heat exchanger (214) further includes:
a second engine fluid conduit (516a) fluidly connecting a second engine fluid inlet (258a) to a second engine fluid outlet (258b),
wherein the second engine fluid conduit is in fluid isolation from the first internal buffer fluid conduit and the first engine fluid conduit, and wherein the second engine fluid conduit is in thermal communication with the first internal buffer fluid conduit and the first engine fluid conduit for heat exchange between the second engine fluid conduit, the first engine fluid conduit, and the first internal buffer fluid conduit;
wherein the second heat exchanger further includes:
a third internal buffer fluid conduit (228) fluidly connecting a third buffer fluid inlet (260a) to a third buffer fluid outlet (260b), wherein the hydrogen fluid conduit is in fluid isolation from the third internal buffer fluid conduit, and wherein the hydrogen fluid conduit is in thermal communication with the third internal buffer fluid conduit for heat exchange between the hydrogen fluid conduit and the buffer fluid conduit, and further comprising:
a third heat exchanger (218) comprising:
a third engine fluid conduit (218a) fluidly connecting a third engine fluid inlet (266a) to a third engine fluid outlet (266b); and
a fourth internal buffer fluid conduit (230) fluidly connecting a fourth buffer fluid inlet (264a) to a fourth buffer fluid outlet (264b),
wherein the third engine fluid conduit is in fluid isolation from the fourth internal buffer fluid conduit, and wherein the second engine fluid conduit is in thermal communication with the fourth internal buffer fluid conduit for heat exchange between the second engine fluid conduit and the fourth internal buffer fluid conduit;
a third external buffer fluid conduit (232) fluidly connecting the third buffer fluid outlet to the fourth buffer fluid inlet for flow of buffer fluid out of the second heat exchanger into the third heat exchanger; and
a fourth external buffer fluid conduit (234) fluidly connecting the fourth buffer fluid outlet to the third buffer fluid inlet for flow of buffer fluid out of the third heat exchanger and into the second heat exchanger.

Clause 8. The system as recited in clause 7, wherein the second heat exchanger is disposed in a main external hydrogen fluid conduit (104), wherein the hydrogen fluid conduit is a first internal hydrogen fluid conduit, the hydrogen fluid inlet is a first hydrogen fluid inlet, and the hydrogen fluid out-let is a first hydrogen fluid outlet, and further comprising:
a fourth heat exchanger comprising (216):
a third engine fluid conduit (216a) fluidly connecting a third engine fluid inlet (258a) to a third engine fluid outlet (258b); and
a fifth internal buffer fluid conduit (228) fluidly connecting a fifth buffer fluid inlet (260a) to a fifth buffer fluid outlet (260b),
wherein the third engine fluid conduit is in fluid isolation from the fifth internal buffer fluid conduit, and wherein the third engine fluid conduit is in thermal communication with the fifth internal buffer fluid conduit for heat exchange between the third engine fluid conduit and the fifth internal buffer fluid; and
a fifth heat exchanger (610) disposed in the main external hydrogen fluid conduit comprising:
a second internal hydrogen fluid conduit (210a) fluidly connecting a second hydrogen fluid outlet (262a) to a second hydrogen fluid outlet (262b), wherein the main external hydrogen fluid conduit connects the first hydrogen inlet to the second hydrogen inlet through first internal hydrogen conduit of the second heat exchanger and the second hydrogen outlet of the fifth heat exchanger; and
a sixth internal buffer fluid conduit (230) fluidly connecting a sixth buffer fluid inlet (264a) to a sixth buffer fluid outlet (264b),
wherein the second internal hydrogen fluid conduit is in fluid isolation from the sixth internal buffer fluid conduit, and wherein the second internal hydrogen fluid conduit is in thermal communication with the sixth internal buffer fluid conduit for heat exchange between the second internal hydrogen fluid conduit and the sixth internal buffer fluid conduit;
a fifth external buffer fluid conduit (232) fluidly connecting the fifth buffer fluid outlet to the sixth buffer fluid inlet for flow of buffer fluid out of the fifth heat exchanger into the sixth heat exchanger; and
a sixth external buffer fluid conduit (234) fluidly connecting the sixth buffer fluid outlet to the fifth buffer fluid inlet for flow of buffer fluid out of the sixth heat exchanger and into the fifth heat exchanger.

Clause 9. The system as recited in clause 7, further comprising:
a fourth heat exchanger (216) comprising:
a third engine fluid conduit (216a) fluidly connecting a third engine fluid inlet to a third engine fluid outlet; and
a fifth internal buffer fluid conduit (228) fluidly connecting a fifth buffer fluid inlet (260a) to a fifth buffer fluid outlet (260b),
wherein the third engine fluid conduit is in fluid isolation from the fifth internal buffer fluid conduit, and wherein the third engine fluid conduit is in thermal communication with the fifth internal buffer fluid conduit for heat exchange between the third engine fluid conduit and the fifth internal buffer fluid conduit;
the second heat exchanger further comprising:
a sixth internal buffer fluid conduit (330) fluidly connecting a sixth buffer fluid inlet (364a) to a sixth buffer fluid outlet (364b);
wherein the hydrogen fluid conduit is in fluid isolation from the sixth internal buffer fluid conduit, and wherein the hydrogen fluid conduit is in thermal communication with the sixth buffer fluid conduit for heat exchange between hydrogen fluid conduit and the sixth internal buffer fluid conduit;
a fifth external buffer fluid conduit (232) fluidly connecting the fifth buffer fluid outlet to the sixth buffer fluid inlet for flow of buffer fluid out of the fifth heat exchanger into the second heat exchanger; and
a sixth external buffer fluid conduit (234) fluidly connecting the sixth buffer fluid outlet to the fifth buffer fluid inlet for flow of buffer fluid out of the second heat exchanger and into the fifth heat exchanger.

Clause 10. An aircraft (1), comprising
a gas turbine engine (100) including:

engine oil system (114);
a compressor (116);
a combustor fluidly connected to an outlet of the compressor; and
a turbine section (116) fluidly connected to an outlet of the combustor; and
the heat exchange system of any one of clauses 1-9, wherein the first heat exchanger is fluidly connected to the engine oil system.

Clause 11. The system as recited in clause 10, wherein the third heat exchanger is fluidly connected to the compressor.

Clause 12. The system as recited in clause 11, wherein the fifth heat exchanger is fluidly connected to the turbine section, wherein each of the first, third, and fifth heat exchangers are fluidly connected to at least one additional respective engine component for flow from the first, third, and fifth heat exchangers to the respective engine component.

Clause 13. The system as recited in clause 1, wherein the buffer fluid is a non-flammable fluid.

Clause 14. The system as recited in clause 13, wherein the buffer fluid has zero water content.

Clause 15. A method for exchanging heat between hydrogen and an engine fluid; comprising:
flowing an engine fluid through an engine fluid conduit (214a) of a first heat exchanger (214);
flowing hydrogen through a hydrogen conduit (208a) of a second heat exchanger (208); and
flowing a buffer fluid through a first buffer fluid conduit (220) of the first heat exchanger and a second buffer fluid conduit (222) of the second heat exchanger, wherein the engine fluid conduit and the first buffer fluid conduit are fluidly isolated, wherein the hydrogen conduit and the second buffer fluid conduit are fluidly isolated;
exchanging heat between the first engine fluid conduit and the first buffer fluid conduit; and
exchanging heat between the second buffer fluid conduit and the hydrogen conduit.

Clause 16. The method as recited in clause 15, wherein the engine fluid is a first engine fluid, wherein the engine fluid conduit is a first engine fluid conduit, and further comprising:
flowing a second engine fluid through a second engine fluid conduit (218a) of a third heat exchanger (218);
flowing the buffer fluid through a third buffer fluid conduit (236) in the third heat exchanger and the second buffer fluid conduit of the second heat exchanger; and
exchanging heat between the second engine fluid conduit and the third buffer fluid conduit.

Clause 17. The method as recited in clause 15, wherein the engine fluid is a first engine fluid, wherein the engine fluid conduit is a first engine fluid conduit, and further comprising:
flowing a second engine fluid through a second engine conduit (416a) of the first heat exchanger (414), wherein the second engine fluid conduit, the first engine fluid conduit, and the first buffer fluid conduit are fluidly isolated; and
exchanging heat between the second engine fluid conduit and the first buffer fluid conduit.

Clause 18. The system as recited in clause 15, wherein the first engine fluid is engine oil, the second engine fluid is engine compressor bleed air, and the third engine fluid is engine turbine exhaust.

Clause 19. The system as recited in clause 15, wherein the buffer fluid is a non-flammable fluid.

Clause 20. The system as recited in clause 19, wherein the buffer fluid has zero water content.

What is claimed is:

1. A method for heating hydrogen in a hydrogen powered aircraft engine; comprising
flowing engine oil through a first engine fluid conduit of a first heat exchanger;
flowing engine compressor bleed air through a second engine fluid conduit of the first heat exchanger;
flowing the hydrogen through a hydrogen conduit of a second heat exchanger;
flowing a buffer fluid through a first buffer fluid conduit of the first heat exchanger and a second buffer fluid conduit of the second heat exchanger, wherein the first engine fluid conduit, the second engine fluid conduit and the first buffer fluid conduit are fluidly isolated, wherein the hydrogen conduit and the second buffer fluid conduit are fluidly isolated;
transferring heat from the engine oil and the engine compressor bleed air flowing through the first and the second engine fluid conduits to the buffer fluid flowing through the first buffer fluid conduit of the first heat exchanger;
transferring heat from the buffer fluid flowing through the second buffer fluid conduit to the hydrogen flowing through the hydrogen conduit of the second heat exchanger;
flowing engine turbine exhaust through a third engine fluid conduit of a third heat exchanger;
flowing the buffer fluid exiting from the second heat exchanger through a third buffer fluid conduit of the third heat exchanger, the third buffer fluid conduit fluidly connected to a fourth buffer fluid conduit of the second heat exchanger, whereby the buffer fluid enters a first buffer inlet of the second heat exchanger to pass through the second buffer fluid conduit and exits the second heat exchanger through a first buffer outlet, the buffer fluid flows from the first buffer outlet to the third heat exchanger to flow through the third buffer fluid conduit, and the buffer fluid flows from the third buffer fluid conduit to a second buffer inlet of the second heat exchanger to pass through the fourth buffer fluid conduit to a second buffer outlet of the second heat exchanger;
transferring heat from the engine turbine exhaust flowing through the third engine fluid conduit to the buffer fluid flowing through the third buffer fluid conduit of the third heat exchanger; and
transferring heat from the buffer fluid flowing through the fourth buffer fluid conduit to the hydrogen flowing through the hydrogen conduit of the second heat exchanger.

2. The method as recited in claim 1, wherein the buffer fluid is a non-flammable fluid.

3. The method as recited in claim 2, wherein the buffer fluid has zero water content.

4. The method as recited in claim 1, comprising using heat from the engine oil, the engine compressor bleed air and the engine turbine exhaust for vaporizing the hydrogen upstream of a combustor of the hydrogen powered aircraft engine.

5. The method as recited in claim 1, comprising providing the second heat exchanger in a main external hydrogen fluid conduit of the hydrogen powered aircraft engine.

* * * * *